Sept. 24, 1957  G. G. ALBERTI  2,807,199
MULTIPLE FILM STRIP CONTACTING PRINTING DEVICE
Filed May 12, 1955
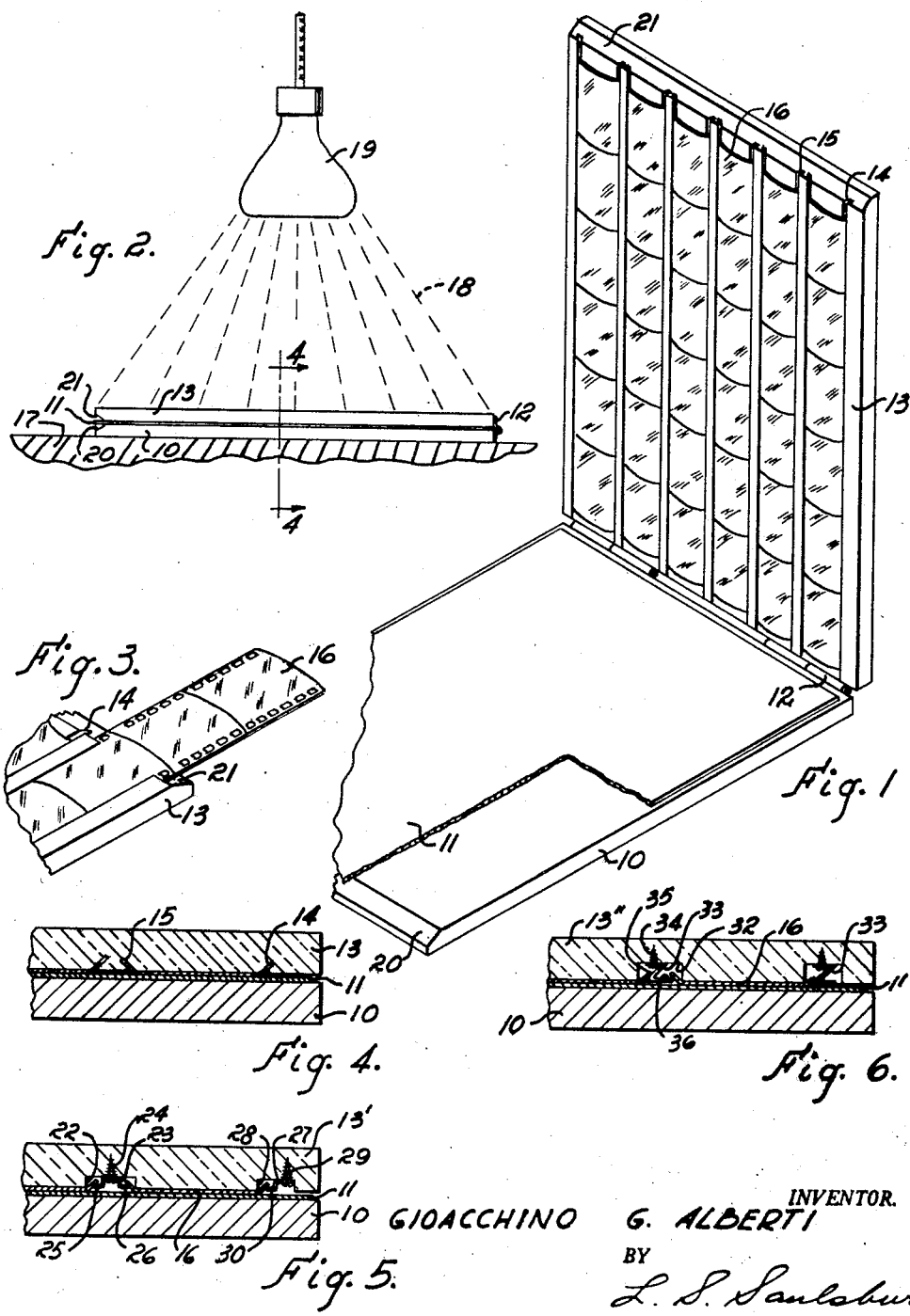
INVENTOR.
GIOACCHINO G. ALBERTI
BY
L. S. Saulsbury
ATTORNEY

United States Patent Office 2,807,199
Patented Sept. 24, 1957

2,807,199

MULTIPLE FILM STRIP CONTACTING PRINTING DEVICE

Gioacchino G. Alberti, Brooklyn, N. Y.

Application May 12, 1955, Serial No. 507,927

3 Claims. (Cl. 95—73)

This invention relates to a multiple film strip contact printing device.

It is an object of the present invention to provide a film strip printing device adapted to receive a plurality of film strips in parallel and side-by-side relationship so that the subject matter thereof can be reproduced upon a single letter-size sheet for observation, study and filing of a large number of pictures.

It is another object of the invention to provide a multiple film strip contact printing device in which the film strips can be easily and quickly loaded into the device by simply threading them into open ends of retaining grooves in a holder part and are flattened automatically in their retaining spaces or grooves as the strips are brought into contact with the printing paper.

It is still another object of the invention to provide a multiple film strip contact printing device in which the film strips are brought down in unison into contact with the printing paper by merely hinging the film strip holding part downward onto the printing paper supporting base.

Other objects of the invention are to provide a multiple film strip contact printing device which is of simple construction, inexpensive to manfacture, has a minimum number of parts, easy to operate, compact, of pleasing appearance and convenient to use.

For a better understanding of the invention reference may be had to the following detailed description taken in connection with the accompanying drawing, in which:

Figure 1 is a perspective view of the film strip contact printing device with the film strip holding part elevated and loaded with film strips preparatory to being hinged onto the base that supports a piece of printing paper;

Fig. 2 is an elevational view of the holder part hinged onto the base to retain the films and the printing paper and a lamp located above the device and distributing light rays thereto;

Fig. 3 is a fragmentary perspective view of the surface of the holder part with illustration being made as to the manner in which the film strips are threaded into the inclined spaces or grooves of the holder part;

Fig. 4 is an enlarged fragmentary sectional view of the device as viewed on line 4—4 of Fig. 2;

Fig. 5 is a sectional view, similar to Fig. 4, of a modified form of the invention employing a flange channel guide in a guideway to retain the edges of the film strips, and Fig. 6 is a sectional view similar to Fig. 4 of another modified form of the invention employing a guide of Z-section in a guideway to retain the edges of the film strips.

Referring now particularly to the Figures 1, 2 and 4, 10 represents a base formed of wood or plastic on which a printing sheet 11 is supported. Hinged to one end of the base 10 by means of a piano-type hinge 12 is a film strip holder part 13 of substantially the same size as the base 10 and form of transparent material in one surface of which is formed or cut oppositely inclined parallel grooves 14 and 15 arranged in pairs and opened at one edge thereof to receive the edges of film strip 16 that can be threaded thereinto and retained in parallel relationship as best shown in Figure 1. With the films in place film strip holder part can be brought down onto the printing sheet 11 and base 10 and the device placed on a supporting surface 17 and subjected to light rays 18 projected from a lamp 19 in the manner as illustrated in Fig. 2.

The ends of the base 10 and holder part 13 opposite from the hinge ends are beveled respectively at 20 and 21 to permit the insertion of the ends of the fingers to lift the holder part from the base upon completion of the printing operation to remove the printed paper.

The space grooves 14 and 15 are formed or cut to extend at an angle of 45 degrees from the surface of the holder part as clearly shown in Fig. 3 and are separated from one another sufficiently to span the picture frame of the films and the edges of the film beyond the perforated sides of the film strip will be contained in the grooves 14 and 15. These spaces or grooves may be coated with non-transparent substance to prevent the perforated edges from being printed.

The depth of the grooves 14 and 15 are sufficient to accommodate the strip and allow movement of the edges of the strip thereinto as the film strips are flattened upon the printing paper. To further permit accommodation of the edges of the film strip the grooves are made to have a width substantially greater than the thickness of the film strip so that the edges of the strip cannot only freely extend into the grooves but may be flexed outwardly so that any bending of the film strip is prevented when contact of the film strip is effected with the printing paper. The film strip, when threaded in the holder, will, because of their edges being deflected, be bowed upwardly and elevated from the surface of the holder part but will be flattened as the holder part is brought down onto the printing paper and their edges extended further into the grooves.

In the form of the invention shown in Fig. 5, a holder part 13' is provided with wide guideways 22 and the edges of the film strip are retained by flanged channel guides 23 centrally retained in the bottom of the guideway 22 by fastening screws 24. The guide 23 has flanges 25 and 26 spaced from the sides of the guideway 22 to accommodate and permit the edges of the film strip to be threaded into the space between the flanges and the sides of the guideway and under the flanges whereby to retain the film strips 16 in place upon the surface of the holder part.

A single guide 27 is secured in a guideway 28 which is of less width than the guideway 22 and by means of fastening screws 29. This guide 27 has a single flange 30 to receive and retain the side edge of the film strip 16.

According to the form of invention shown in Fig. 6, a holder part 13" has wide guideways 32 in which guides 33 are centrally secured by fastening screws 34. These guides are of Z-shaped section to provide an edge 35 spaced from one side of the guideway 32 and a flange 36 spaced from the opposite side of the guideway. The fastening screws 34 may be secured by extending a screwdriver through an opening not shown in the outer part of the guide. The screws are preferably flatheaded so as not to interfere with the edges of the film strip 16 as they are threaded into the guideways 32. The guides in the forms of the invention shown in Figs. 5 and 6 are preferably opaque to keep the perforations of the side edges of the film strip from being printed.

It should now be apparent that there has been provided a film strip contact printing device which will accommodate a plurality of film strips that are easily and quickly inserted into the film strip holder part by threading action from the free edge of the holder part and that the retaining grooves or spaces that hold the edges are of sufficient size, shape and inclination as to frictionally grip the edges of the strip to hold them against free sliding therein and to accommodate the extension of the edges of the film edges as the holder part is brought down onto the base and the film strip flattened on the printing paper.

It will also be apparent that with the holder part being transparent that the light rays will readily penetrate the same and the film to effect a printing action of the film upon the printing sheet.

While various changes may be made in the detailed construction, it shall be understood that such changes shall be within the spirit and scope of the present invention as defined by the appended claims.

What is claimed is:

1. A film strip contact printing device comprising a base, a film strip holder part adapted to be extended over and cooperate with said base to retain a printing sheet therebetween, said holder part being formed of transparent material and having oppositely inclined spaced guideway grooves provided in the contacting surface thereof for receiving the edges of the film strip and to permit the extension of the edges thereunto and the sliding of the same upon the contacting surface of the holder part so that the strip will be brought into flush contact with the printing sheet when the holder part is weighted upon the film strip and the base.

2. A film strip contact printing device as defined in the claim 1, and said oppositely inclined spaced guideway grooves being sufficiently deep to provide a distance between the bottoms of the oppositely spaced grooves greater than the width of the film strip and wider than the thickness of the film strip whereby the film strip can be freely inserted into the grooves and yet be frictionally retained, when released, against movement by the opposed faces of the grooves, the distance between the inner side faces of the respective grooves and upon the surface of the holder part being equal to the width of the picture frame of the film.

3. A multiple film strip contact printing device comprising a printing sheet supporting base, a transparent holder-part hingedly connected to said base and of sufficient size to accommodate a plurality of film strips in side-by-side relationship, pairs of oppositely inclined elongated spaces formed on the inner surface of the holder part to accommodate the side edges of the film strips, said spaces being open to the free edge of the holder part to permit the threading of said film strips thereinto, said spaces being spaced from one another a distance equal to the width of a picture frame, the distances between the bottoms of the spaces being greater than the width of the film strip so that the edges of the film strip may be extended thereinto as the film strip is flattened upon contact with the printing sheet.

References Cited in the file of this patent

UNITED STATES PATENTS

| | | |
|---|---|---|
| 1,229,527 | Rundle | June 12, 1917 |
| 1,840,307 | Bornmann | Jan. 12, 1932 |

FOREIGN PATENTS

| | | |
|---|---|---|
| 6,886 | Great Britain | of 1913 |
| 233,955 | Great Britain | May 21, 1925 |
| 506,589 | Great Britain | May 30, 1939 |